United States Patent
Dindi et al.

(10) Patent No.: US 6,746,658 B2
(45) Date of Patent: Jun. 8, 2004

(54) RHODIUM CLOTH CATALYST FOR PARTIAL OXIDATION OF HYDROCARBONS

(75) Inventors: Hasan Dindi, Wilmington, DE (US); William H. Manogue, Newark, DE (US); John J. Barnes, Hockessin, DE (US)

(73) Assignee: ConocoPhillips Company, Houston, TX (US)

( * ) Notice: Subject to any disclaimer, the term of this patent is extended or adjusted under 35 U.S.C. 154(b) by 49 days.

(21) Appl. No.: 09/838,124

(22) Filed: Apr. 19, 2001

(65) Prior Publication Data

US 2002/0176817 A1 Nov. 28, 2002

Related U.S. Application Data

(60) Provisional application No. 60/198,791, filed on Apr. 20, 2000.

(51) Int. Cl.[7] .................................................. C01B 3/26
(52) U.S. Cl. ..................... 423/651; 423/418.2; 252/373
(58) Field of Search ....................... 252/373; 423/418.2, 423/651; 502/325, 326

(56) References Cited

U.S. PATENT DOCUMENTS

| | | | |
|---|---|---|---|
| 4,087,259 A | * 5/1978 | Fujitani et al. | 48/212 |
| 4,491,640 A | 1/1985 | Sadamori et al. | 502/242 |
| 4,863,893 A | 9/1989 | Farrauto et al. | 502/325 |
| 5,232,891 A | 8/1993 | Hörmann et al. | 502/326 |
| 5,278,124 A | 1/1994 | Hochella et al. | 502/326 |
| 5,510,056 A | 4/1996 | Jacobs et al. | 252/373 |
| 5,639,401 A | 6/1997 | Jacobs et al. | 252/373 |
| 5,648,582 A | 7/1997 | Schmidt et al. | 585/652 |
| 5,654,491 A | 8/1997 | Goetsch et al. | 568/469.9 |
| 5,883,138 A | 3/1999 | Hershkowitz et al. | 518/703 |

FOREIGN PATENT DOCUMENTS

| | | | |
|---|---|---|---|
| EP | 0 303 438 | 2/1989 | C01B/3/38 |
| EP | 0 576 096 A2 | 12/1993 | C01B/3/38 |
| EP | 0 629 578 A | 12/1994 | |
| EP | 0 640 559 A1 | 3/1995 | C01B/3/38 |
| WO | WO 97/31738 | 9/1997 | B22F/3/11 |
| WO | WO 99/35082 | 7/1999 | C01B/3/38 |

OTHER PUBLICATIONS

Z. Tian et al; *The State of Rh During the Partial Oxidation of Methane Into Synthesis Gas*; Catalysis Letters 57 (1999); pp. 9–17.

K. H. Hofstad et al.; *Partial Oxidation of Methane Over Platinum Metal Gauze*; Catalysis Letters 36 (1996); pp. 25–30.

M. Fathi et al.; *Partial Oxidation of Methane to Synthesis Gas at Very Short Contact Times*; Catalysis Today (1998); pp. 205–209.

E. P. J. Mallens et al.; *The Reaction Mechanism of the Partial Oxidation of Methane to Synthesis Gas: A Transient Kinetic Study Over Rhodium and a Comaprison with Platinum*; Journal of Catalysis Letters 167 (1997); pp. 43–56.

M. V. Twigg et al.; *Metal and Coated–Metal Catalysts: Structured Catalysts and Reactors*; Marcel Dekker, Inc. (1998); pp. 61–66.

* cited by examiner

Primary Examiner—Stanley S. Silverman
Assistant Examiner—Maribel Medina
(74) Attorney, Agent, or Firm—Conley Rose, P.C.

(57) ABSTRACT

This invention provides a catalyst and a process for the catalytic partial oxidation of a hydrocarbon feedstock by contacting a feed stream including a hydrocarbon feedstock and an oxygen-containing gas with a catalyst in a reaction zone maintained at conversion-promoting conditions effective to produce an effluent stream including carbon monoxide and hydrogen. The process of this invention is characterized by using a porous catalyst containing rhodium, such as rhodium gauze or rhodium felt.

24 Claims, 9 Drawing Sheets i ii ii

Gas Inlet        Gas Outlet i iv ii v iii vi

Gas Inlet    Gas Outlet i iv ii v iii vi

RHODIUM CLOTH CATALYST FOR PARTIAL OXIDATION OF HYDROCARBONS

CROSS-REFERENCE TO RELATED APPLICATIONS

The present application claims the benefit of 35 U.S.C. 111(b) provisional application Serial No. 60/198,791 filed Apr. 20, 2000, and entitled "Rhodium Cloth Catalyst for Partial Oxidation of Hydrocarbons".

STATEMENT REGARDING FEDERALLY SPONSORED RESEARCH OR DEVELOPMENT

Not Applicable.

FIELD OF THE INVENTION

The present invention relates to a process for the catalytic partial oxidation of hydrocarbons (e.g., natural gas), and in particular to a process for oxidizing methane to produce a mixture of carbon monoxide and hydrogen using a bulk rhodium catalyst in the form of metal cloth, such as gauze or felt.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is converted into a mixture of carbon monoxide and hydrogen (i.e., synthesis gas or syngas). In a second step, the syngas is converted into hydrocarbons.

Current industrial use of methane as a chemical feedstock proceeds by the initial conversion of methane to carbon monoxide and hydrogen by either steam reforming, which is the most widespread process, or by dry reforming. Steam reforming is currently the major process used commercially for the conversion of methane to synthesis gas, and proceeds according to Equation 1.

$$CH_4 + H_2O \rightleftharpoons CO + 3H_2 \qquad (1)$$

Although steam reforming has been practiced for over five decades, efforts to improve the energy efficiency and reduce the capital investment required for this technology continue.

The catalytic partial oxidation of hydrocarbons, e.g., natural gas or methane to syngas is also a process known in the art. While currently limited as an industrial process, partial oxidation has recently attracted much attention due to its significant inherent advantages, such as the fact that significant heat is released during the process, in contrast to steam reforming processes.

In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

$$CH_4 + \tfrac{1}{2}O_2 \rightarrow CO + 2H_2 \qquad (2)$$

This ratio is more useful for the downstream conversion of the syngas to chemicals such as methanol and to fuels than the $H_2$:CO ratio steam reforming. The partial oxidation is also exothermic, while the steam reforming reaction is strongly endothermic. Furthermore, oxidation reactions are typically much faster than reforming reactions. This allows the use of much smaller reactors for catalytic partial oxidation processes.

The syngas produced by either steam reforming or partial oxidation may be converted to hydrocarbon products, for example, fuels boiling in the middle distillate range, such as kerosene and diesel fuel, and hydrocarbon waxes by processes such as the Fischer-Tropsch Synthesis.

The selectivities of catalytic partial oxidation to the desired products, carbon monoxide and hydrogen, are controlled by several factors. One of the most important factors is the choice of catalyst structure. For successful operation on a commercial scale, the catalytic partial oxidation process must be able to achieve a high conversion of the methane feedstock at high gas hourly space velocities, while maintaining high selectivity of the process to the desired products of carbon monoxide and hydrogen. Accordingly, there has been an effort to investigate catalysts that provide high selectivity for specified products and have structures that promote partial oxidation of hydrocarbons at high gas hourly space velocities, such as metal gauze catalysts.

Certain specialized catalysts are known to be suitable for other, unrelated catalytic reactions. For example, platinum/rhodium alloy gauze catalysts, typically about 5–15 wt % rhodium, are used industrially for the catalytic synthesis of hydrogen cyanide, as well as for the catalytic oxidation of ammonia to nitric acid. In addition to allowing high gas throughput, gauze catalysts are typically mechanically durable. Platinum/rhodium catalysts used for hydrogen cyanide and nitric acid synthesis typically have lives of several months before being removed for remanufacturing by reclaiming up to 99% of the metal and using it to make new catalyst. A characteristic of platinum/rhodium catalysts however is a tendency to undergo surface rearrangement. It is known in the art that surface rearrangement contributes to the reduction of catalyst life due to pore plugging. A typical form of surface rearrangement of platinum/rhodium alloy catalyst, for example when used for ammonia oxidation, is the formation of dendritic excrescences, as disclosed in "Stuctured Catalysts and Reactors," edited by A. Cybulski and J. A. Moulijn, 1998, pp. 61–66, hereby incorporated herein by reference.

Similar platinum/rhodium alloy gauze catalysts have been disclosed as having utility for the synthesis of a mixture of synthesis gas and formaldehyde, such as is disclosed in U.S. Pat. No. 5,654,491 and European Patent 064559. A process that includes formaldehyde formation has the disadvantage of less selectivity to synthesis gas formation.

Some platinum group gauze catalysts have been studied as hydrogen synthesis catalysts. For example, M. Fathi et al., Catal. Today, 42, 205–209 (1998) disclose the catalytic partial oxidation of methane over Pt, Pt/Rh, Pt/Ir and Pd gauze catalysts at contact times of 0.00021 to 0.00033 seconds. Single gauze catalysts were tested in a quartz reactor at 700° C. to 1100° C. and it was observed that, although high selectivities to carbon monoxide were observed at high temperatures, the selectivity to hydrogen gas was low, "below 30% in most cases."

Further, K. Heitnes Hofstad, et. al. Catalysis Letters 36, 25–30 (1996) disclose: "Partial oxidation of methane has been studied on a Pt gauze catalyst under conditions where the conversion of $O_2$ was not complete. The results show that at these very low space times high selectivities of CO are obtained, but low selectivities of $H_2$ (are obtained) even at temperatures above 800° C."

Notwithstanding the foregoing patents and teachings, there remains a need for a process for the partial oxidation of hydrocarbons using a long-lived, durable catalyst suited to produce synthesis gas with high conversions of methane, high selectivities to both CO and $H_2$, and with high gas throughput.

SUMMARY OF THE INVENTION

The present invention provides a catalyst and a process for the catalytic partial oxidation of a hydrocarbon feedstock by contacting a feed stream comprising the hydrocarbon feedstock and an oxygen-containing gas with a catalyst in a reaction zone maintained at conversion-promoting conditions that are effective to produce an effluent stream comprising carbon monoxide and hydrogen. The catalyst preferably includes high surface area bulk rhodium. More preferably, the catalyst is in the form of at least one layer of rhodium cloth. As used herein and described in detail below, the term "rhodium cloth" refers to a mechanically fixed arrangement of metal wire in a substantially planar configuration and is intended to include rhodium gauze and rhodium felt.

The present catalysts are preferably pretreated to activate the catalyst by oxidation in air at a temperature of between about 300° C. and about 1200° C., preferably between about 900° C. and about 1000° C. Preferably, the air oxidation pretreatment is carried out for a period of time of about one half to four hours.

The preferred catalysts allow effective partial oxidation of the feed gas with high selectivity, together with high methane conversion. CO and $H_2$ selectivities of at least 90% and methane conversion rates of at least 90% are achieved. Further, the preferred catalysts are durable and have long lived activity. The preferred catalysts can typically be used without replacement for a period of at least about six months.

The present gauze and felt catalysts are preferably made of wire of about 0.025 to about 0.25 mm diameter, preferably about 0.1 mm diameter. The gauze catalyst preferably includes two or more layers of gauze, and more preferably from about 5 to about 100 layers. A preferred gauze layer is about 20 to about 100 mesh, preferably about 40 to about 80 mesh. Correspondingly, felt densities are from about 10% to about 50%, preferably 35%. The felt thickness is preferably from about 5 mm to about 50 mm.

The preferred ranges of operating conditions for using the present catalysts include temperatures of about 800° C. to about 1300° C., preferably from about 1000° C. to about 1200° C., and pressures of about 110 kPa to about 3000 kPa, preferably from about 500 kPa to about 3000 kPa. In addition, the feed stream is preferably preheated to from about 50° C. to about 700° C., and preferably to about 400° C., before contacting the catalyst. Typical space velocities for the process are from about 60,000 $hr^{-1}$ to about 20,000,000 $hr^{-1}$, and are preferably from about 150,000 $hr^{-1}$ to about 10,000,000 $hr^{-1}$.

DESCRIPTION OF THE DRAWINGS

For an introduction to the detailed description of the preferred embodiments of the invention, reference will now be made to the accompanying drawings, wherein.

DETAILED DESCRIPTION OF THE PREFERRED EMBODIMENTS

Figure 1:
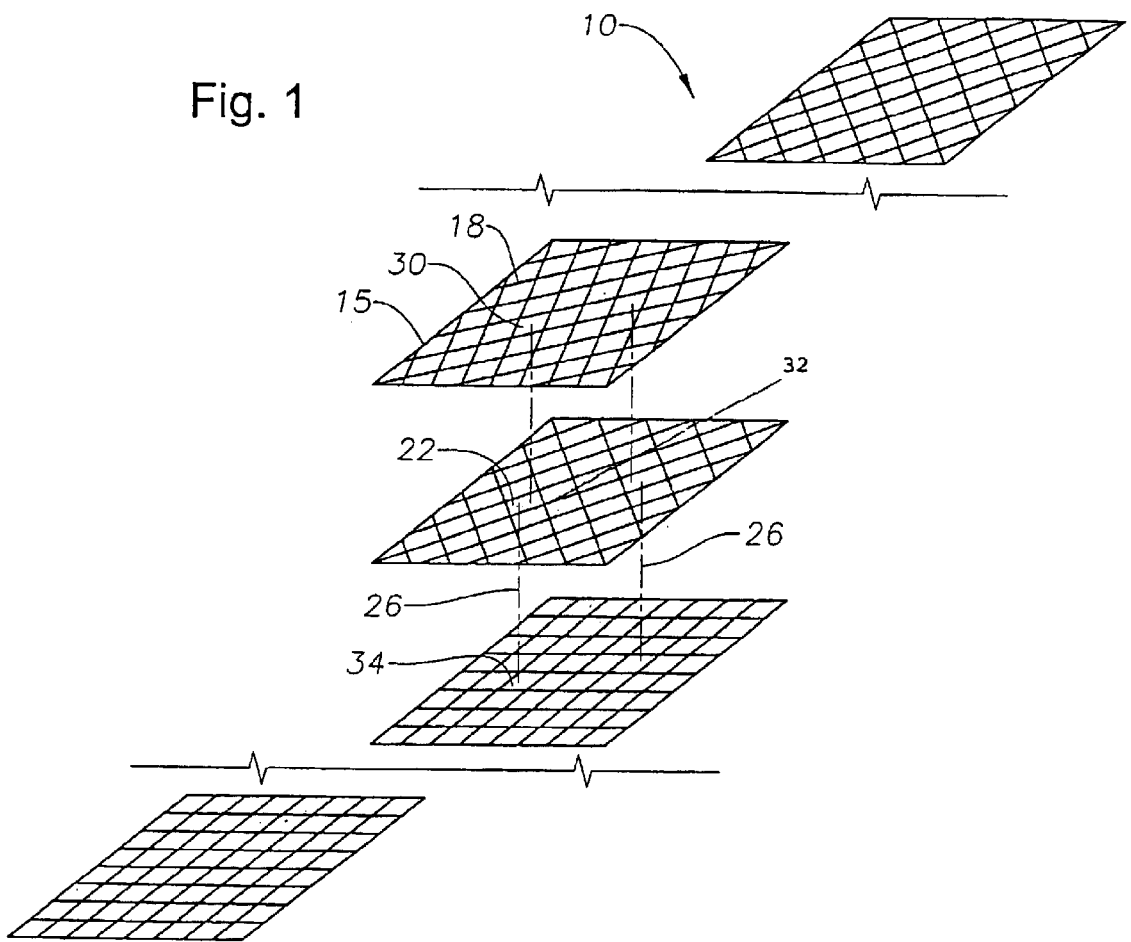
FIG. 1 is an exploded schematic view of a gauze catalyst according to one embodiment.

With reference to FIG. 1, a preferred gauze catalyst structure 10 in accordance with the present invention comprises a plurality of woven layers of gauze 15 each made from a plurality of wires 18. The passages between the wires are hereinafter termed "pores" 22. A path 26 shows the connection between two pores 22, which are part of a network of pores. Thus, for example, gas or liquid entering pore 30 can reach pore 34 by way of pore 32.

Figure 2:
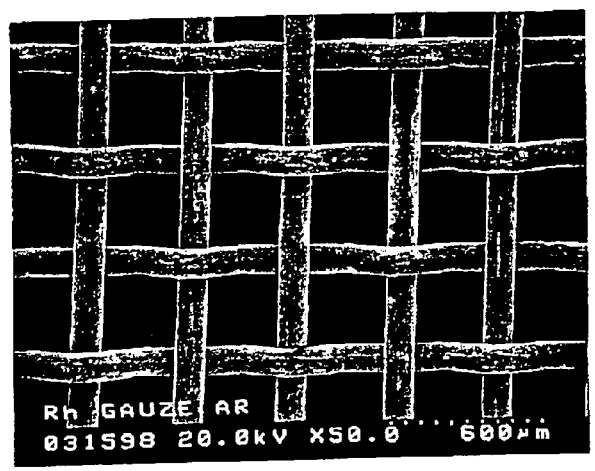
FIGS. 2i–iii are SEM micrographs of a rhodium gauze catalyst.
Figure 2:
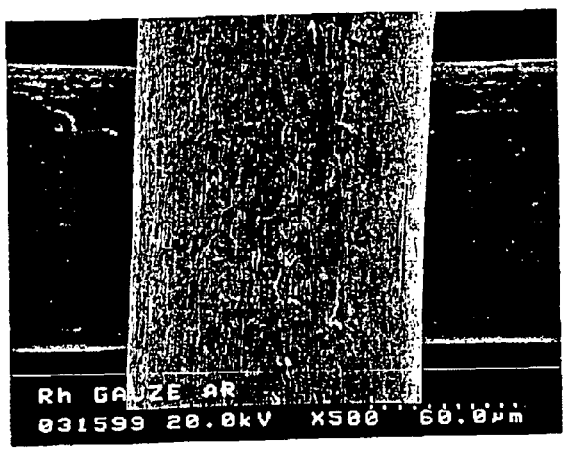
Figure 2:
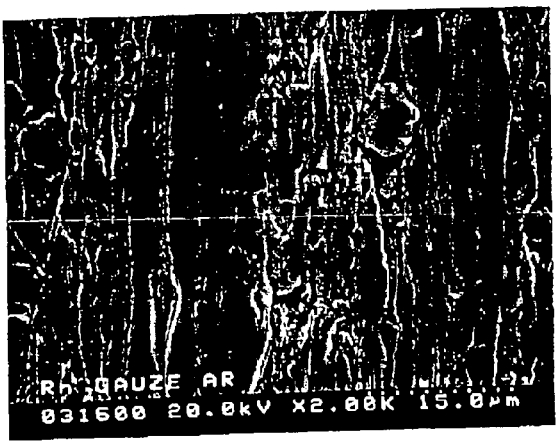

With reference to FIG. 2, the gauze of the preferred embodiment comprises a flexible screen of about 20 to about 100 mesh (0.84 mm to about 0.15 mm) and preferably about 40 to about 80 mesh (0.37 mm to about 0.18 mm). The gauze is made of wire that is preferably about 0.025 mm to about 0.25 mm diameter and preferably about 0.1 mm. While one layer of gauze may be used in some instances, it is generally preferred to use a bundle of two or more layers of gauze, and preferably 5 to about 100 layers, as the catalyst, more preferably about 15–40 layers.

Figure 3:
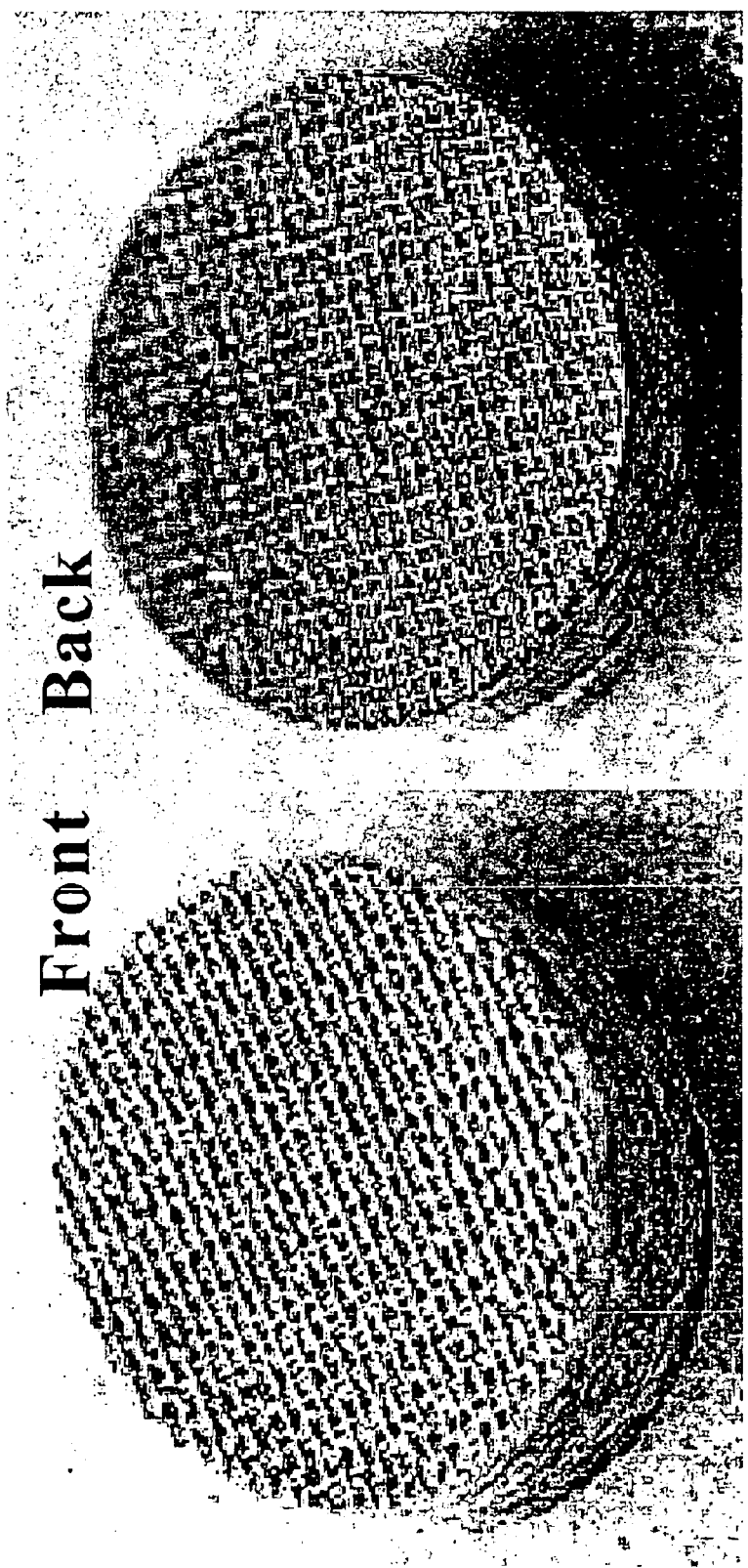
FIG. 3 is a magnified view of a catalyst bundle of comprising layers of gauze according to one embodiment of the present invention.

With reference now to FIG. 3, a preferred embodiment of the present catalyst includes a stack of more than one layer of gauze disks, for example 25 layers. As above, each layer preferably comprises rhodium wire that has been woven to form a gauze. The layers may be aligned or may be shifted in alignment with respect to each other, as shown in FIG. 4i. Alternatively, the layers can be randomly oriented with respect to each other. While the shape of the catalyst bundle, or of a single layer of catalyst, will vary according to its application, the stack is preferably cylindrical so that it can be used in a cylindrical quartz reactor.

The preferred catalyst includes at least a metal catalytically active for synthesis gas production. Suitable metals include rhodium, platinum, and rhodium in combination with Pt, Ru, Ir, NI, Au, Pd, Ti, Re, or V. Metallic catalysts can be supported or unsupported. Suitable cloth-type supports include base metal wire, such as Fe, Cr, and Al, and combinations of Fe, Cr, and Al. The metals commonly used as wire catalyst supports typically have excellent high temperature strength and good ductility, and can be drawn into wire easily and inexpensively. Wire catalyst supports may be treated so as to form a surface layer that acts as a barrier and prevents diffusion of catalytic metal from the surface into the bulk metal of the support. Further details concerning the treatment of the metallic catalyst support to form a diffusion barrier are contained in U.S. patent application Ser. No. 09/626,894 filed Jul. 27, 2000, now U.S. Pat. No. 6,488,907 and entitled "Catalytic Partial Oxidation Processes and Catalytic Diffusion Barrier Coating," hereby incorporated herein by reference.

Figure 4:
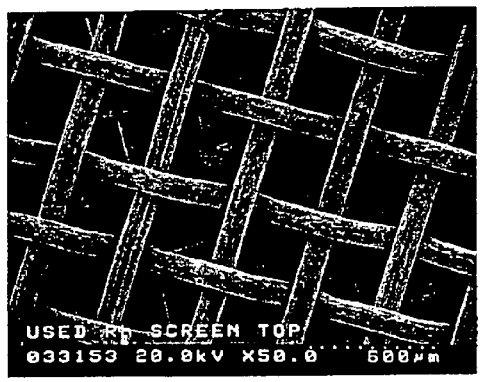
FIGS. 4i–vi are SEM micrographs of a rhodium gauze catalyst after use viewed from the top (i–iii) and bottom (iv–vi)
Figure 4:
Figure 4:
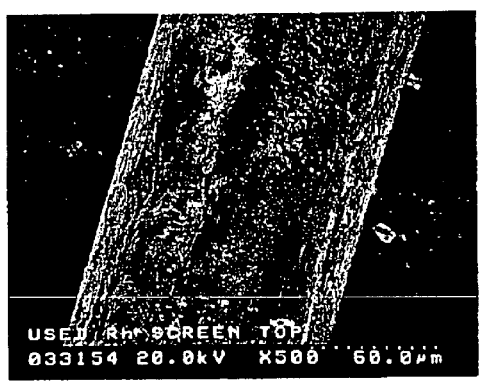
Figure 4:
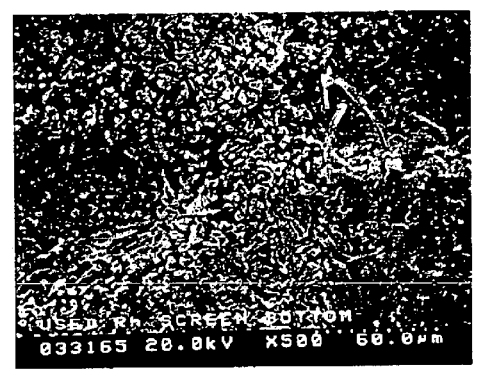
Figure 4:
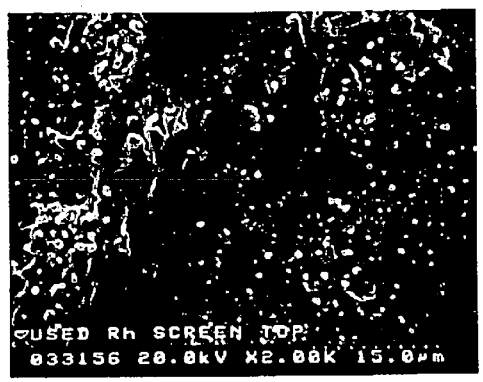
Figure 4:
Figure 5:
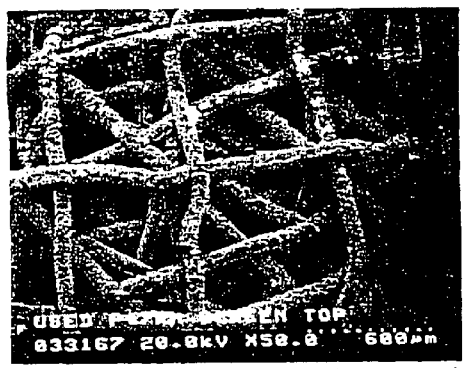
FIGS. 5i–vi are SEM micrographs of a platinum/rhodium gauze catalyst (previously used HCN catalyst) after use viewed from the top (i–iii) and bottom (iv–vi)
Figure 5:
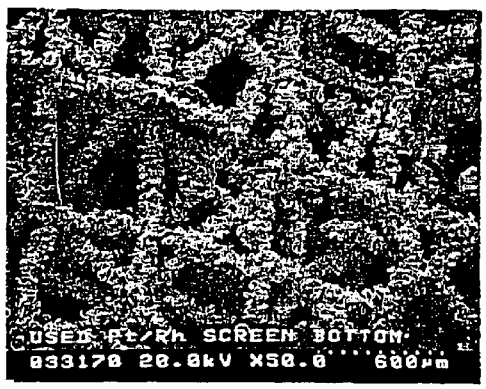
Figure 5:
Figure 5:
Figure 5:
Figure 5:
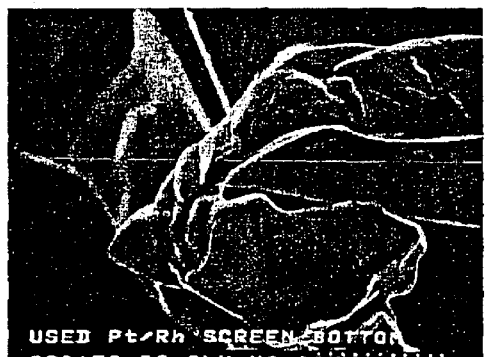

Now referring to FIGS. 4 and 5, it has been discovered that rhodium wire containing at least 90 wt % rhodium performs surprisingly well as a catalyst. A preferred catalyst comprises at least 95 wt % rhodium. More preferably, the gauze comprises substantially pure bulk rhodium wire. In FIGS. 4 and 5, a rhodium catalyst and a catalyst comprising 85 wt % platinum/15 wt % rhodium catalyst, respectively, are shown as viewed by scanning electron microscopy after use as a partial oxidation catalyst. As noted in FIG. 5, the Pt/Rh catalyst had been previously used for hydrogen cyanide synthesis, but this is not believed to affect the synthesis gas experiments performed using that catalyst. A surprising result of the present invention is the significantly modest, as well as different, surface rearrangement of the used rhodium catalyst, as compared with the used Pt/Rh catalyst. This is illustrated by comparing each of FIGS. 4*i–vi* and FIGS. 5*i–vi*, respectively, in pairs. FIGS. 4*i*/5*i* and 4*iv*/5*iv* show the top and bottom, respectively, of their respective catalysts at 50 times magnification; FIGS. 4*ii*/5*ii* and show same items 500 times magnification; and FIGS. 4*iii*/5*iii* (4*vi* and 5*vi*) shown the top (bottom) of the respective catalyst at 2000 times magnification. There is both less surface rearrangement in the rhodium catalyst and less rearrangement on a smaller length scale, as compared with the platinum/rhodium catalyst. As a result, the present rhodium catalyst exhibits superior catalytic durability and long active life.

The catalysts process of the present invention can be used to prepare a mixture of carbon monoxide and hydrogen from any gaseous hydrocarbon having a low boiling point. The hydrocarbon feedstock is in the gaseous phase when contacting the catalyst. The catalysts are suitable for the partial oxidation of methane, natural gas, associated gas or other sources of light hydrocarbons having 1 to 5 carbon atoms. Natural gas is mostly methane, but it can also contain up to about 15 mole % ethane, propane and butane. The present process can be used for the conversion of gas from naturally occurring reserves of methane, which can also contain carbon dioxide, nitrogen and hydrogen sulfide. A preferred feed for the present process comprises at least 50% by volume methane, more preferably at least 75% by volume, and most preferably at least 80% by volume.

The hydrocarbon feedstock is preferably contacted with the present catalyst in a reaction zone as a mixture with an oxygen-containing gas, preferably pure oxygen. The methane-containing feed and the oxygen-containing gas are mixed in such amounts to give a carbon (i.e., carbon in methane) to oxygen ratio from about 1.25:1 to about 3.3:1, more preferably from about 1.3:1 to about 2.3:1, and most preferably from about 1.5:1 to about 2.2:1.

The syngas generation can take place at atmospheric or superatmospheric pressures, with the latter being preferred. For example, the present process can be operated at pressures of from about 110 kPa to about 3000 kPa, and is preferably carried out at pressures between about 500 kPa and 2800 kPa.

The catalysts of the preferred embodiment are preferably used at temperatures between about 800° C. and about 1300° C., and preferably from about 1000° C. to about 1200° C. The hydrocarbon feedstock and the oxygen-containing gas are preferably pre-heated to between about 50° C. and about 700° C., and preferably to about 300° C.–500° C., before contacting the catalyst The hydrocarbon feedstock and the oxygen-containing gas can be passed over the catalyst at a variety of space velocities. Typical space velocities for the present process are from about 60,000 hr$^{-1}$ to about 20,000,000 hr$^{-1}$, preferably from about 150,000 hr$^{-1}$ to about 10,000,000 hr$^{-1}$.

The catalyst is preferably pretreated by oxidation in air. Preferred oxidation conditions include a temperature between about 300° C. and 1200° C., preferably between about 900° C. and 1000° C. Further, the exposure of the catalyst to air preferably proceeds for about one half to four hours.

EXAMPLES

Figure 6:
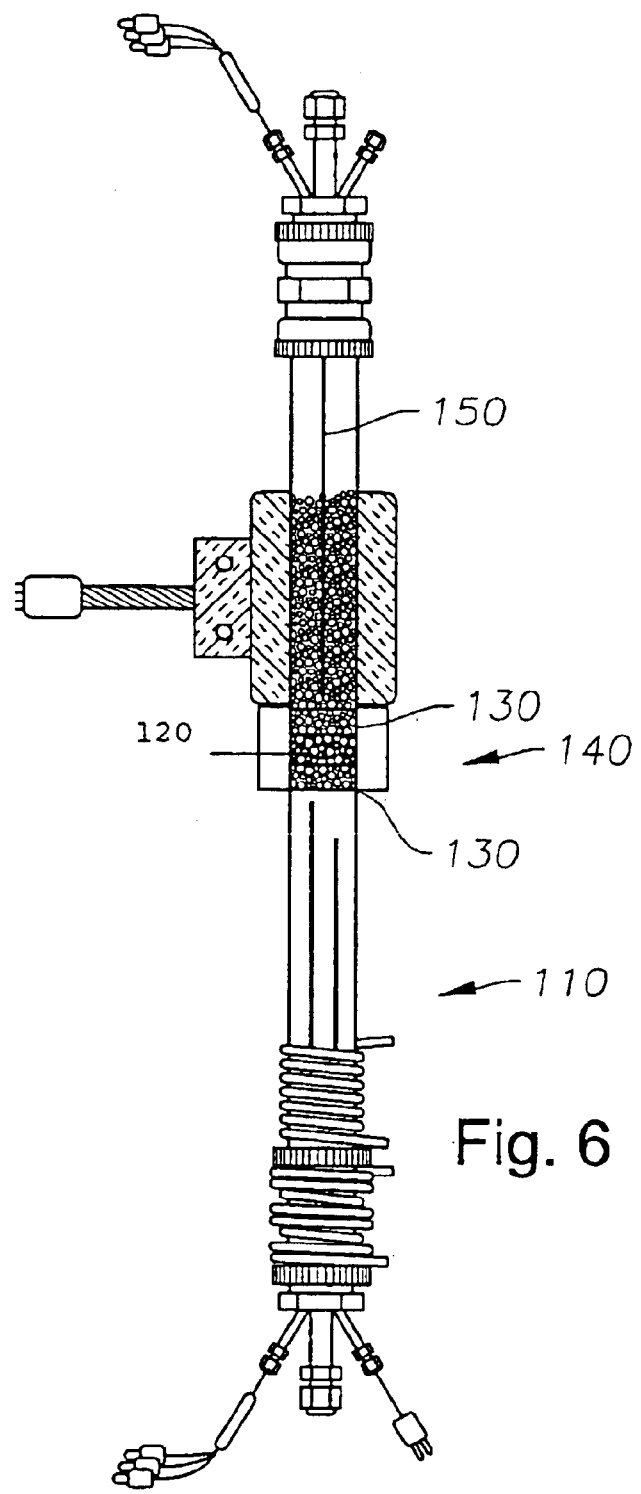
FIG. 6 is a schematic drawing of a quartz reactor suitable for laboratory scale tests of the catalysts of the preferred embodiment.

Referring now to FIG. 6, a reactor 110 suitable for laboratory investigation of the catalyst of the preferred embodiments is shown in schematic. This reactor resembles in shape a reactor suitable for industrial catalysis, but is scaled down in size. A reactor constructed in this manner was used to perform the examples set out below. The partial oxidation reactions were done with a 19 mm O.D.×13 mm I.D. quartz reactor 110 with a circular bundle 120 of gauze disks (12 mm O.D.) held between two 5 mm×12 mm alpha-alumina foam disks 130, which served as radiation shields. The inlet radiation shield also aids in uniform distribution of the feed gases. The gauze and the disks were wrapped with an alumina cloth to obtain a single cylinder 140 of 13 mm diameter and about 15 mm height. The catalyst was tightly forced inside the reactor to minimize gas by-pass. A band heater was fitted around the quartz reactor. The band heater was used to supply thermal energy to light off the reaction and to preheat the feed gases. After light off, no heating was provided to the reaction zone. Thus, the reaction proceeded autothermally. Two Type S thermocouples 150, one at each end of the gauze stack, were used to monitor the reaction temperature.

Figure 7:
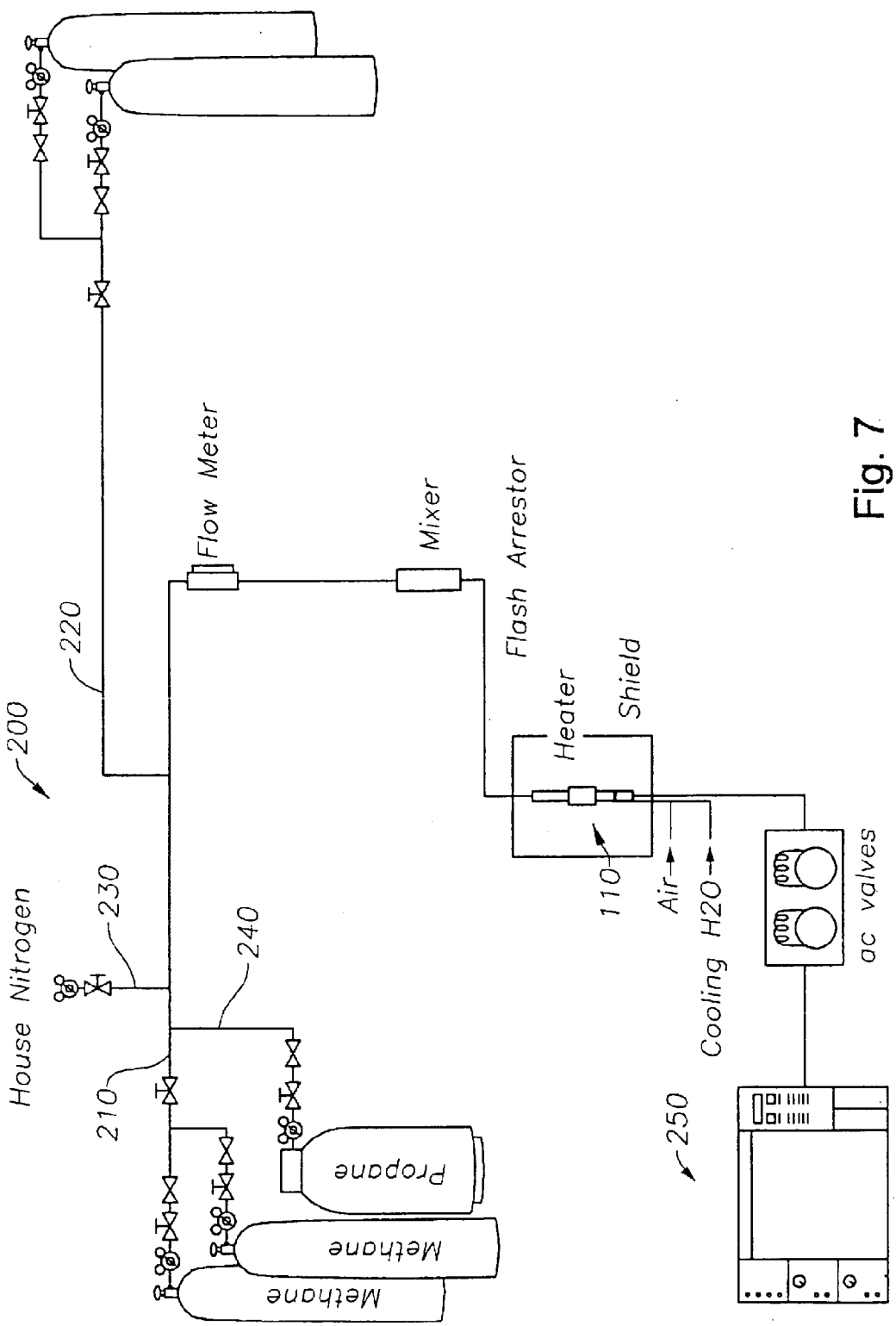
FIG. 7 is a schematic of the bench scale testing unit for the catalysts of the preferred embodiment.

To carry out tests on the novel catalysts a system such as that shown in FIG. 7 was assembled. Specifically a laboratory bench scale syngas unit 200 included a gas supply system. Syngas unit 200 is illustrated in FIG. 7 for methane as the fuel. Alternatively, syngas unit 200 and the gas supply system are adapted to use a simulated natural gas mixture as the fuel. Referring again to FIG. 7, the gas supply system includes a methane supply line 210, an oxygen supply line 220, and a nitrogen supply line 230. Methane supply line 210 has a propane tie-in 240. The propane tie-in is preferably used for starting up the syngas reaction because the ignition temperature of a propane/air flame is lower than that of a methane/air flame. Nitrogen is added at about 5% by volume as an inert tracer component. Unit 200 is controlled by a computer (not shown), for example by a Texas Instruments Model 545 PLC system interfaced to a PC using a Wonderware Human-Machine Interface Program. The methane and oxygen gases are mixed together at room temperature and the mixed gas fed to reactor 110 with or without preheating. The reaction takes place at 4 psig, for example, and on the catalyst surface. Product gas mixtures may be analyzed for methane, oxygen, carbon monoxide, hydrogen gas, carbon dioxide, and nitrogen gas, using any known analysis equipment. This system was used to test the catalysts of the following examples. The methane-containing and oxygen gases were mixed at room temperature and the mixed gas was fed to the reactor with or without preheating. The product gas mixture was analyzed for $CH_4$, $O_2$, CO, $H_2$, $CO_2$ and $N_2$ using a gas chromatograph 250 equipped with a thermal conductivity detector.

Examples 1–13

The results of partial oxidation reactions at a variety of conditions are shown in Tables 1, 2 and 3. In Tables 1, 2, and 3, GHSV is gas hourly space velocity, Pre-H is the preheat temperature, Cat-T is the top of the catalyst bed temperature, Cat-B is the bottom of the catalyst bed temperature. NG is a simulated natural gas mixture consisting of 7 volume % ethane and 3 volume % propane the rest being methane. For Examples 1 to 12, the catalyst consisted of 25 layers of 60 mesh (0.25 mm) rhodium gauze. For Example 13, the catalyst consisted of 40 layers of 40 mesh (0.4 mm) Pt (85%)/Rh (15%) gauze. A comparison of the data listed for examples 1–12 with the data listed for example 13 shows that the rhodium catalyst had higher methane conversion and selectivity than the platinum/rhodium catalyst. For Examples 1 to 7 (Table 1), the fuel was a simulated natural gas mixture consisting of 7 volume % ethane, 3 volume % propane and 90 volume % methane. For Examples 8 to 12 (Table 2) and 13 (Table 3), the fuel was pure methane. For examples 1–12, the pressure ranged in the examples from 116–150 kPa. Follow-up tests in a 2-inch diameter high pressure partial oxidation reactor showed that the rhodium gauze catalyst has similar performance at elevated pressures, up to at least about 800 kPa. Catalytic activity at such higher pressures is desirable for a synthesis gas production process that coupled to a Fischer Tropsch process of hydrocarbon production such that the produced thesis gas forms the feed stream for the Fischer-Tropsch process.

Examples 14–83

Partial oxidation reactions were carried out as in Examples 8–12. The results are shown Table 4. In Table 4, NLPM is the flow rate in normal liters/minute. For Table 4, a flow rate of 1 NLPM is equivalent to a space velocity of about 90,000 $hr^{-1}$ for this catalyst. The run began on day 0 and was stopped on day 102. During that period the run was stopped several times and re-started. With these stoppage times subtracted, there were a total of 82 days of catalyst run time.

The unit was shut down because of equipment problems on day 2 and was re-started with a new set of thermocouples on day 4. The run continued from day 4 until day 65 without interruption. During this time, high and low grade methane was used as feed. The low grade methane contained 5–10% ethane, 1–3% propane, and some carbon dioxide. The high grade methane contained 99% methane by volume. On day 25 the flow rate and the pre-heat were modified as shown in Table 5, causing the fuel conversion to increase by more than 10%, while maintaining high CO conversion. The catalyst temperature decreased from about 1200° C. to about 1100° C. gradually over the course of the 82 days of catalyst run time. At the end of the test the pressure was increased to 2 atm at constant mass flow rate. The change in pressure did not appear to affect the conversion and selectivity appreciably.

TABLE 1

Catalyst = 25 layers of 60 mesh Rh gauze
Fuel = simulated natural gas

| EX. | Pressure (psig) | Pressure (kPa) | Temp (° C.) Pre-H | Temp (° C.) Cat-T | Temp (° C.) Cat-B | % $CH_4$ Conv. | % CO Sel. | % $H_2$ Sel. | GHSV ($hr.^{-1}$) | $NG:O_2$ Ratio | $H_2:CO$ Ratio |
|---|---|---|---|---|---|---|---|---|---|---|---|
| 1 | 2.2 | 116 | 461 | 537 | 1018 | 86 | 95 | 82 | 460,000 | 1.98 | 1.72 |
| 2 | 2.4 | 118 | 480 | 557 | 1021 | 91 | 97 | 89 | 470,000 | 1.88 | 1.84 |
| 3 | 6.9 | 149 | 400 | 451 | 1067 | 86 | 95 | 84 | 950,000 | 1.97 | 1.82 |
| 4 | 7.1 | 150 | 402 | 455 | 1065 | 89 | 96 | 87 | 960,000 | 1.92 | 1.80 |
| 5 | 6.4 | 145 | 407 | 462 | 1062 | 90 | 96 | 84 | 940,000 | 1.90 | 1.75 |
| 6 | 6.7 | 148 | 406 | 464 | 1045 | 97 | 95 | 85 | 960,000 | 1.81 | 1.79 |
| 7 | 3.9 | 128 | 502 | 623 | 945 | 90 | 94 | 81 | 240,000 | 1.84 | 1.72 |

TABLE 2

Catalyst = 25 layers of 60 mesh Rh gauze
Fuel = methane

| EX. | Pressure (psig) | Pressure (kPa) | Temp (° C.) Pre-H | Temp (° C.) Cat-T | Temp (° C.) Cat-B | % $CH_4$ Conv. | % CO Sel. | % $H_2$ Sel. | GHSV ($hr.^{-1}$) | $CH_4:O_2$ Ratio | $H_2:CO$ Ratio |
|---|---|---|---|---|---|---|---|---|---|---|---|
| 8 | 2.4 | 118 | 442 | 518 | 1014 | 80 | 95 | 85 | 440,000 | 1.86 | 1.78 |
| 9 | 2.5 | 119 | 498 | 573 | 1019 | 87 | 95 | 87 | 450,000 | 1.78 | 1.83 |
| 10 | 2.8 | 121 | 459 | 542 | 1003 | 93 | 95 | 89 | 460,000 | 1.69 | 1.86 |
| 11 | 0.9 | 108 | 497 | 610 | 947 | 78 | 93 | 82 | 220,000 | 1.83 | 1.75 |
| 12 | 5.1 | 136 | 415 | 475 | 1051 | 90 | 95 | 88 | 900,000 | 1.74 | 1.87 |

TABLE 3

Catalyst = 40 layers of 40 mesh Pt (85%)/Rh (15%) gauze
Fuel = methane

| EX. | Pressure (psig) | Pressure (kPa) | Temp (° C.) Pre-H | Temp (° C.) Cat-T | Temp (° C.) Cat-B | % $CH_4$ Conv. | % CO Sel. | % $H_2$ Sel. | GHSV ($hr.^{-1}$) | $CH_4:O_2$ | $H_2:CO$ |
|---|---|---|---|---|---|---|---|---|---|---|---|
| 13 | 2.2 | 116 | 354 | 1186 | 1187 | 69 | 94 | 63 | 280,000 | 1.81 | 1.34 |

There are at least two groups of days for which each of the % CO selectivity, the % H$_2$ selectivity, and the methane conversion were consistently at least 90%. The first group of days includes days 28–40, examples 34–42. For these days, the methane/oxygen ratio ranged from 1.60 to 1.75, the preheat temperature ranged from 615–630° C., and the flow rate was 8.0 NLPM. The second group of days includes days 68–78, examples 71–85. For these days, the methane/oxygen ratio ranged from 1.66–1.71, the preheat temperature ranged from 390–470° C., and the flow rate was either 8.0 NLPM or 12.0 NLPM. Of the days for which the percent conversion was at least 97%, the greatest selectivity occurred on day 68, examples 61–64. In those examples, the % CO selectivity was 100% and the % H$_2$ selectivity was at least 97%. The molar ratio of methane to oxygen was 1.66, the preheat temperature was 470° C., and the flow rate was 8 NLPM.

Catalytic activity was maintained throughout the 82 day run. It is believed that a rhodium gauze catalyst can have a lifetime of up to 1–2 years, depending on operating conditions. One measure of the lifetime is the half-life, that is the duration of time over which the catalytic activity, such as molar % methane conversion, decreased by one-half from its initial value. For the present catalyst the half-life appears to be about 1–2 years.

TABLE 4

Catalyst = 25 layers of 60 mesh Rh gauze
two 5 mm × 12 mm and 40 ppi alpha-alumina foam disks
Feed = methane

| EX. # | Day | CH$_4$/O$_2$ Ratio | Preheat (° C.) | Feed Flowrate (NLPM) | H$_2$/CO Ratio | % Conversion | % CO Selectivity | % H$_2$ Selectivity |
|---|---|---|---|---|---|---|---|---|
| 14 | 0 | | | | | | | |
| 15 | 2 | 1.87 | | 5.0 | 1.69 | 77 | 95 | 80 |
| 16 | 2 | 1.86 | 65 | 5.0 | 1.70 | 75 | 94 | 78 |
| 17 | 5 | 1.83 | 240 | 5.0 | 1.71 | 76 | 98 | 85 |
| 28 | 6 | 1.83 | 250 | 5.0 | 1.60 | 76 | 95 | 77 |
| 19 | 7 | 1.82 | 250 | 5.0 | 1.60 | 74 | 98 | 78 |
| 20 | 8 | 1.82 | 250 | 5.0 | 1.60 | 74 | 97 | 79 |
| 21 | 12 | 1.83 | 250 | 5.0 | 1.68 | 74 | 98 | 82 |
| 22 | 14 | 1.85 | 240 | 5.0 | 1.69 | 73 | 97 | 82 |
| 23 | 21 | 1.86 | 270 | 5.0 | 1.70 | 74 | 93 | 78 |
| 24 | 23 | 1.87 | 200 | 5.0 | 1.66 | 74 | 95 | 79 |
| 25 | 23 | 1.87 | 500 | 8.0 | 1.88 | 85 | 97 | 92 |
| 26 | 26 | 1.97 | 580 | 5.2 | 1.85 | 81 | 96 | 89 |
| 27 | 26 | 1.90 | 620 | 8.0 | 1.92 | 86 | 96 | 92 |
| 28 | 26 | 1.90 | 625 | 8.0 | 1.94 | 85 | 96 | 94 |
| 29 | 27 | 1.90 | 560 | 8.0 | 1.88 | 86 | 97 | 91 |
| 30 | 27 | 1.82 | 560 | 8.0 | 1.90 | 90 | 98 | 93 |
| 31 | 27 | 1.80 | 565 | 8.0 | 1.94 | 93 | 96 | 92 |
| 32 | 28 | 1.91 | 560 | 8.0 | 1.88 | 84 | 98 | 92 |
| 33 | 28 | 1.90 | 600 | 8.0 | 1.90 | 86 | 97 | 92 |
| 34 | 28 | 1.75 | 615 | 8.0 | 1.96 | 97 | 97 | 95 |
| 35 | 29 | 1.75 | 615 | 8.0 | 1.94 | 97 | 97 | 95 |
| 36 | 30 | 1.75 | 620 | 8.0 | 1.94 | 94 | 97 | 94 |
| 37 | 33 | 1.75 | 615 | 8.0 | 1.94 | 97 | 97 | 93 |
| 38 | 34 | 1.74 | 615 | 8.0 | 1.92 | 96 | 97 | 93 |
| 39 | 35 | 1.74 | 615 | 8.0 | 1.92 | 96 | 98 | 94 |
| 40 | 36 | 1.60 | 630 | 8.0 | 1.81 | 93 | 97 | 96 |
| 41 | 37 | 1.61 | 630 | 8.0 | 1.81 | 92 | 98 | 97 |
| 42 | 40 | 1.75 | 625 | 8.0 | 1.88 | 94 | 97 | 91 |
| 43 | 41 | 1.72 | 620 | 8.0 | 1.89 | 94 | 98 | 93 |
| 44 | 42 | 1.85 | 610 | 8.0 | 1.89 | 88 | 98 | 93 |
| 45 | 43 | 1.92 | 600 | 8.0 | 1.84 | 82 | 98 | 91 |
| 46 | 45 | 1.79 | 600 | 8.0 | 1.76 | 80 | 98 | 94 |
| 47 | 47 | 1.92 | 680 | 5.2 | 1.68 | 71 | 99 | 92 |
| 48 | 49 | 1.92 | 700 | 5.2 | 1.69 | 70 | 99 | 92 |
| 49 | 52 | 1.92 | 700 | 5.2 | 1.66 | 69 | 96 | 92 |
| 50 | 54 | 2.08 | 700 | 5.2 | 1.81 | 71 | 97 | 87 |
| 51 | 55 | 1.83 | 700 | 5.2 | 1.84 | 84 | 98 | 93 |
| 52 | 56 | 1.88 | 700 | 5.2 | 1.82 | 85 | 97 | 88 |
| 53 | 57 | 1.72 | 725 | 5.2 | 1.83 | 86 | 98 | 93 |
| 54 | 58 | 1.87 | 545 | 7.7 | 1.82 | 85 | 99 | 90 |
| 55 | 61 | 1.96 | 725 | 5.2 | 1.80 | 80 | 97 | 87 |
| 56 | 62 | 1.94 | 660 | 5.2 | 1.82 | 80 | 98 | 89 |
| 57 | 63 | 1.88 | 670 | 5.2 | 1.80 | 81 | 99 | 91 |
| 58 | 64 | 1.85 | 440 | 8.0 | 1.86 | 87 | 95 | 88 |
| 59 | 64 | 1.85 | 440 | 8.0 | 1.84 | 87 | 96 | 90 |
| 60 | 65 | 1.87 | 450 | 8.0 | 1.84 | 85 | 98 | 88 |
| 61 | 68 | 1.66 | 470 | 8.0 | 1.85 | 97 | 100 | 97 |
| 62 | 68 | 1.66 | 470 | 8.0 | 1.85 | 97 | 100 | 97 |
| 63 | 68 | 1.66 | 470 | 8.0 | 1.85 | 97 | 100 | 98 |
| 64 | 68 | 1.66 | 470 | 8.0 | 1.85 | 97 | 100 | 98 |
| 65 | 71 | 1.66 | 475 | 8.0 | 1.87 | 97 | 94 | 92 |
| 66 | 71 | 1.66 | 475 | 8.0 | 1.86 | 97 | 93 | 91 |
| 67 | 71 | 1.66 | 475 | 8.0 | 1.87 | 97 | 96 | 93 |

TABLE 4-continued

Catalyst = 25 layers of 60 mesh Rh gauze
two 5 mm × 12 mm and 40 ppi alpha-alumina foam disks
Feed = methane

| EX. # | Day | CH$_4$/O$_2$ Ratio | Preheat (° C.) | Feed Flowrate (NLPM) | H$_2$/CO Ratio | % Conversion | % CO Selectivity | % H$_2$ Selectivity |
|---|---|---|---|---|---|---|---|---|
| 68 | 72 | 1.66 | 390 | 12.0 | 1.86 | 98 | 98 | 96 |
| 69 | 73 | 1.67 | 390 | 12.0 | 1.86 | 97 | 98 | 95 |
| 70 | 74 | 1.66 | 395 | 12.0 | 1.87 | 95 | 97 | 90 |
| 71 | 74 | 1.79 | 395 | 12.0 | 1.87 | 92 | 97 | 90 |
| 72 | 75 | 1.71 | 395 | 12.0 | 1.87 | 94 | 97 | 91 |
| 73 | 78 | 1.71 | 400 | 12.0 | 1.84 | 93 | 98 | 90 |
| 74 | 78 | 1.71 | 400 | 12.0 | 1.84 | 93 | 98 | 90 |
| 75 | 78 | 1.71 | 400 | 12.0 | 1.85 | 93 | 98 | 90 |
| 76 | 79 | 1.74 | 320 | 18.3 | 1.78 | 88 | 98 | 87 |
| 77 | 80 | 1.70 | 325 | 18.3 | 1.77 | 88 | 96 | 90 |
| 78 | 81 | 1.70 | 340 | 18.3 | 1.75 | 87 | 96 | 89 |
| 79 | 81 | 1.70 | 340 | 18.3 | 1.75 | 87 | 96 | 88 |
| 80 | 81 | 1.70 | 340 | 18.3 | 1.76 | 87 | 95 | 88 |
| 81 | 82 | 1.70 | 420 | 18.3 | 1.76 | 87 | 99 | 87 |
| 82 | 82 | 1.70 | 420 | 18.3 | 1.75 | 86 | 100 | 87 |
| 83 | 82 | 1.70 | 420 | 18.3 | 1.76 | 86 | 99 | 87 |

Examples 84–91

Figure 8:
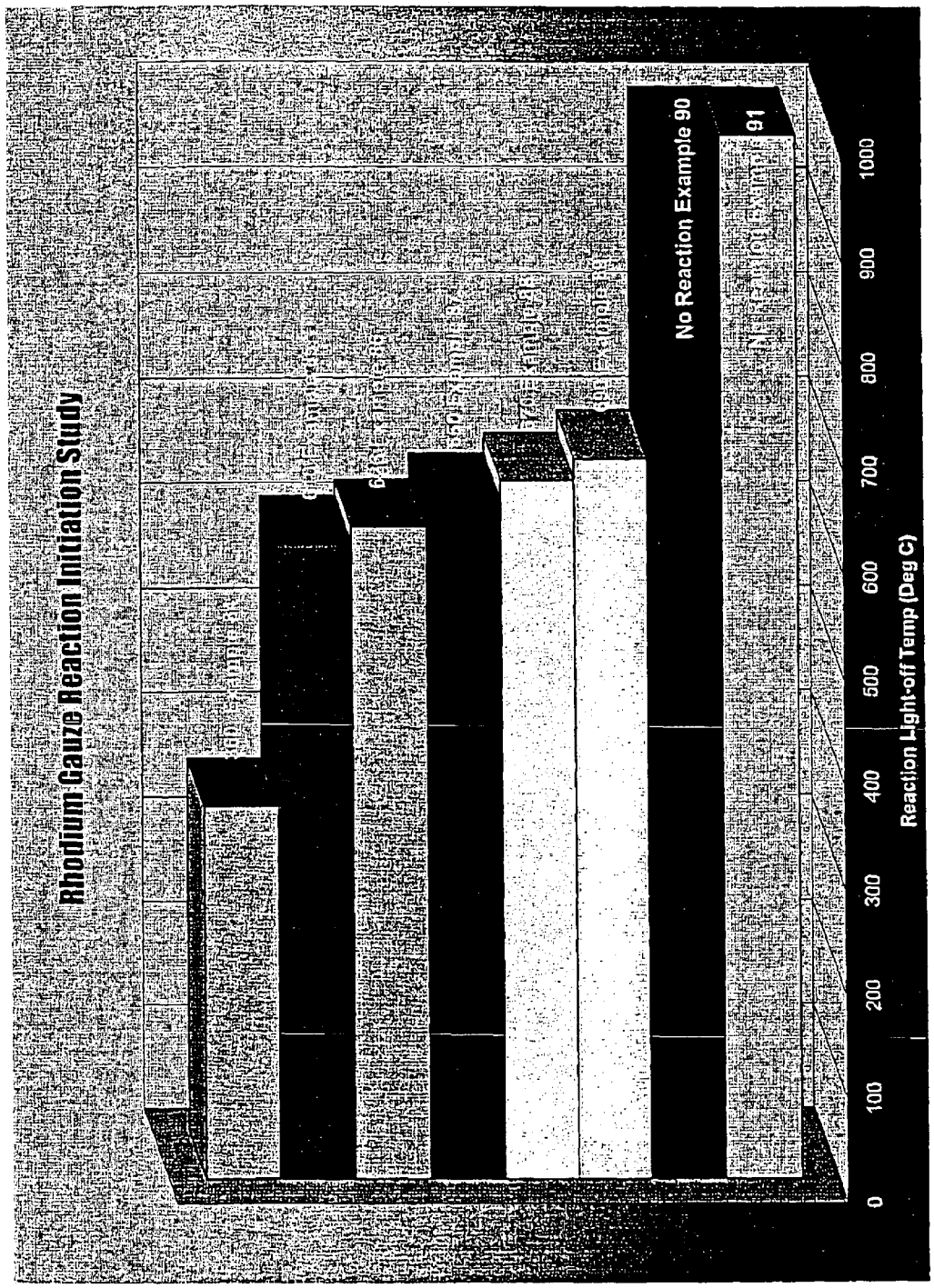
FIG. 8 is a chart of results of reaction light-off tests of a rhodium gauze catalyst.

Tests were performed to determine conditions sufficient for light-off. Reactor and catalyst are the same as in Examples 1–12 and 14–83, with the exception of the number of layers of catalyst. Various catalyst pretreatments were tested. For Examples 84–91 the catalyst, pretreatment, and light-off conditions are given in Table 5. The catalyst of Example 90 was subsequently oxidized in air at 500° C. for 4 hours and light-off was attempted. The catalyst was subsequently reduced in flowing hydrogen at 600° C. for 12 hours and light-off was attempted. It is believed that the reduction in hydrogen was complete and the catalyst did not differ significantly from fresh catalyst. The catalyst bundles was divided into at least 4 bundles of 3 layers and one bundle of 5 layers. These served as the catalyst for Examples 85, 87, 88, 89, and 86, respectively. The catalyst of Example 85 was subsequently reduced in flowing hydrogen for 12 hours. It is believed that the reduction in hydrogen was complete and the catalyst did not differ significantly from fresh catalyst. This catalyst then served as the catalyst for Example 84. The catalyst of Example 91 was freshly prepared. Referring now to FIG. 8, the results of tests for reaction light-off are shown. The results show that the lowest light-off temperature was obtained for a pretreatment of oxidation in air at about 900° C. for about four hours. The results also show that no reaction was achieved using untreated catalyst. For each catalyst for which light-off was achieved using 22 volume % propane in air, no light-off was achieved using 11 volume % propane in air. For the catalyst of Example 86 light-off was subsequently achieved at 360 C. with 11 volume % propane in air.

TABLE 5

| Example | Gauze Layers | Pretreatment Method | % Propane (by volume) for Light-off |
|---|---|---|---|
| Example 84 | 3 | Air Calcined at 900° C. for 4 hours | 11 |
| Example 85 | 3 | Air Calcined at 600° C. for 5 hours | 22 |
| Example 86 | 5 | Air Calcined at 700° C. for 5 hours | 14 |
| Example 87 | 3 | Flamed for 20 minutes | 22 |
| Example 88 | 3 | Flamed for 10 minutes | 11 |
| Example 89 | 3 | Flamed for 3 minutes; HCl leached | 22 |
| Example 90 | 24 | Untreated | NA |
| Example 91 | 3 | Boiled in Aqua Regia | NA |

Figure 9:
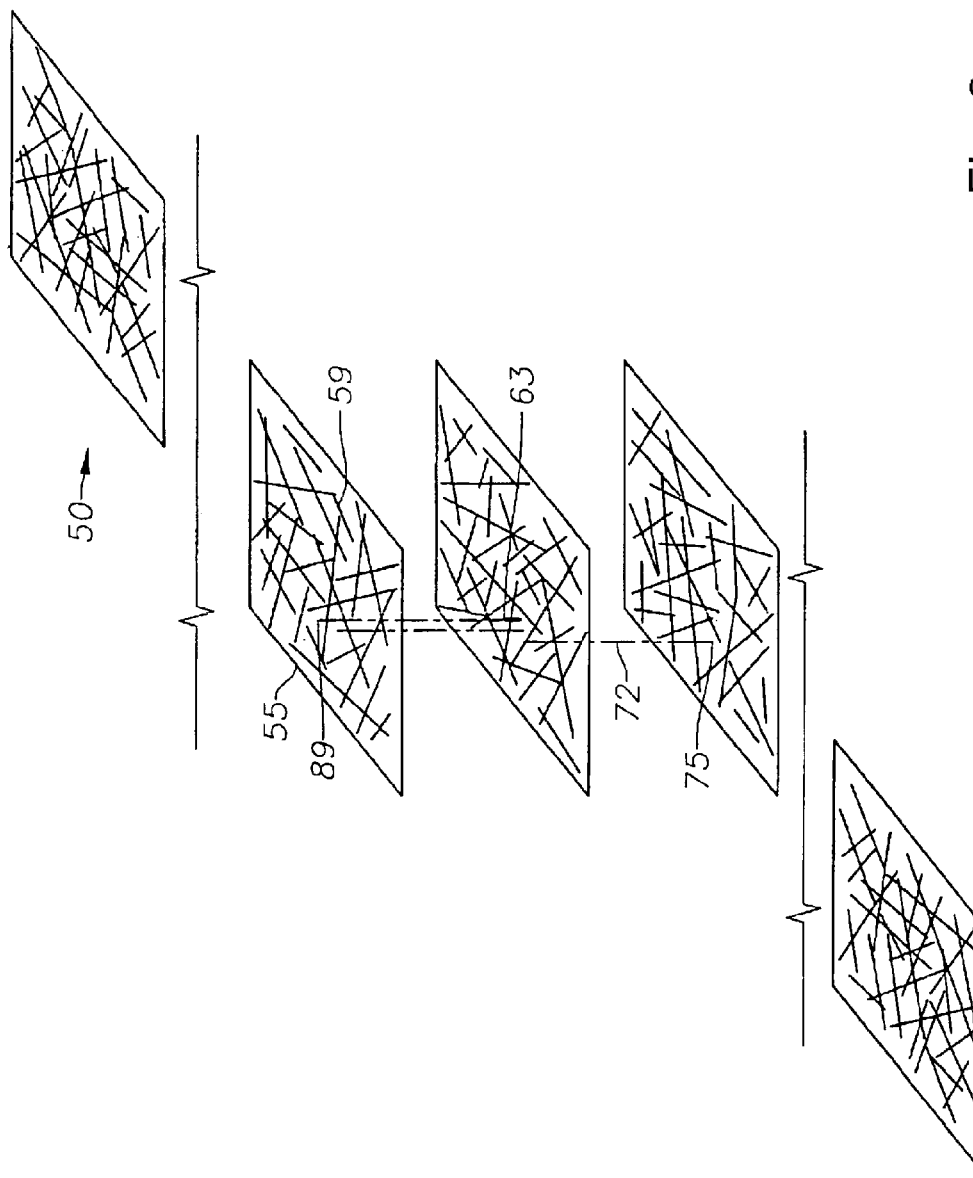
FIG. 9 is an exploded schematic view of a felt catalyst of the preferred embodiment.

With reference now to FIG. 9, an alternative preferred catalyst structure 50 comprises layers of felt 55 made from random lengths of wire 59, which have been sintered together to form a cloth. The spaces or passages between the wires are hereinafter termed "pores" 63. A path 72 illustrates the connection between pores. Thus, for example, gas or liquid entering pore 75 can reach pore 89 by way of pore 63. The felt preferably is composed of random lengths of wire sintered together under pressure at elevated temperature. The felt is made from about 0.025 mm to about 0.25 mm diameter wire, preferably, about 0.1 mm. Felt densities are from about 10% to about 50% by volume, preferably, 35%. The felt thickness is preferably from about 5 mm to about 50 mm. Preferably, pure rhodium wire is used to form the felt. The felt is preferably shaped to conform to the inside of a reactor.

It is understood that rhodium gauze is exemplary of a bulk metal catalyst having a high surface area and a mechanically durable structure. Preferably the catalyst made from one or more layers of a metal cloth. The term metal cloth refers to a mechanically fixed arrangement of metal wire in a substantially planar configuration. The metal cloth of the present invention includes wire in various configurations such as woven, knitted, fused, and the like. Gauze and felt are exemplary of metal cloth structures. Further, the catalyst preferably is made from metal in a network structure defining a network including substantially planar pores and passages connecting at least a portion of the pores. The network of pores is preferably arranged geometrically such that a volume of gas therein is constrained to remain near the catalyst surface. The metal network may be regular, as for a single layer of gauze, or may be irregular, as with a layer of felt. Alternatively, the metal network may have elements of both regularity and irregularity, as with a plurality of layers of gauze that are not aligned with each other. Still further, the catalyst structure preferably includes a large metallic surface area forming a reactive interface. It is believed that, in this manner, the dependence of reaction dynamics on mass transfer is minimized, so that the conversion rate of the catalyst may be optimized. Without further elaboration, it is believed that one skilled in the art can, using the description herein, utilize the present invention to its fullest extent. The foregoing embodiments are to be construed as illustrative, and not as constraining the remainder of the disclosure in any way whatsoever.

While preferred embodiments of this invention have been shown and described, modifications thereof can be made by one skilled in the art without departing from the spirit or teaching of this invention. The embodiments described herein are exemplary only and are not limiting. Many variations and modifications of the catalyst and process are possible and are within the scope of the invention. Accordingly, the scope of protection is not limited to the embodiments described herein, but is only limited by the claims which follow, the scope of which shall include all equivalents of the subject matter of the claims.

We claim:

1. A process for the catalytic partial oxidation of a light hydrocarbon feedstock, comprising:

contacting a feed stream comprising a light hydrocarbon feedstock and an oxygen-containing gas with a porous bulk metal catalyst at conversion-promoting conditions effective to produce an effluent stream comprising carbon monoxide and hydrogen;

wherein the catalyst comprises a metal cloth;

wherein the metal comprises at least 90 wt % rhodium; and wherein said conversion-promoting conditions include passing said feed stream over said catalyst at a gas hourly space velocity of at least about 60,000 hr$^{-1}$.

2. The process of claim 1, wherein carbon monoxide is produced at a carbon selectivity of at least about 80%.

3. The process of claim 1, wherein hydrogen is produced at a hydrogen selectivity of at least about 70%.

4. The process of claim 1, wherein hydrogen is produced at a hydrogen selectivity of about 100% and the hydrocarbon conversion is at least about 97%.

5. The process of claim 1, wherein the catalyst comprises a gauze consisting essentially of rhodium.

6. The process of claim 1, wherein the catalyst comprises a felt consisting essentially of rhodium.

7. The process of claim 1, further comprising pretreating the catalyst by exposure to air under conditions sufficient to oxidize the catalyst.

8. The process of claim 7 wherein the conditions include a temperature of about 300° C. to about 1200° C.

9. The process of claim 8 wherein the conditions include a temperature of about 900° C. to about 1000° C.

10. The process of claim 7 wherein the catalyst is pretreated for a duration of time of about one half hour to about four hours.

11. The process of claim 1, wherein the catalyst has a catalytic half-life of at least about six months.

12. The process of claim 11 wherein the catalyst has a catalytic half-life of from about six months to about 2 years.

13. The process of claim 1, further comprising preheating said feed stream above about 30°C.

14. The process of claim 13 wherein the feed stream is preheated to a temperature between about 50° C. and about 700° C.

15. The process of claim 14 wherein the feed stream is preheated to a temperature between about 400° C.-500° C.

16. The process of claim 1 wherein maintaining the reaction zone further comprises maintaining pressure in said reaction zone between about 500 kPa and about 3000 kPa.

17. The process of claim 1 wherein said feed stream comprises a methane to oxygen molar ratio of about 1.5:1 to about 2.2:1.

18. The process of claim 1 wherein the hydrogen feedstock comprises at least about 50% by volume methane.

19. The process of claim 1, wherein contacting the feed stream with the catalyst comprises passing the feed stream over the catalyst at a space velocity from about 150,000 to about 10,000,000 hr$^{-1}$.

20. A process for the catalytic partial oxidation of a light hydrocarbon feedstock, comprising:

contacting a feed stream comprising a light hydrocarbon feedstock and an oxygen-containing gas feed stream with a catalyst at conversion-promoting conditions effective to produce an effluent stream comprising carbon monoxide and hydrogen;

wherein the catalyst consists of at least 90 wt % rhodium;

wherein carbon monoxide is produced at a carbon selectivity of at least about 80%; and wherein hydrogen is produced at a hydrogen selectivity of at least about 60%; and wherein said conversion-promoting conditions include passing said feed stream over said catalyst at a gas hourly space velocity of at least about 60,000 hr$^{-1}$.

21. The process of claim 20 wherein the catalyst comprises a felt.

22. The process of claim 20 wherein the catalyst comprises a gauze.

23. The process of claim 20 wherein the hydrocarbon feedstock comprises at least about 50% methane by volume.

24. A process for the catalytic partial oxidation of a light hydrocarbon feedstock, comprising:

(a) preheating a feed stream comprising a light hydrocarbon feedstock and oxygen gas to at least about 350° C.;

(b) passing the feed stream over a catalyst consisting of at least 90 wt % rhodium, at a space velocity from about 150,000 to about 10,000,000 hr$^{-1}$ at conversion-promoting conditions comprising a pressure from about 500 kPa to about 3000 kPa wherein the conditions are effective to produce an effluent stream comprising carbon monoxide and hydrogen;

wherein the catalyst is selected from the group consisting of rhodium felt and rhodium gauze, the carbon monoxide is produced at a carbon selectivity of at least about 80%, and the hydrogen is produced at a hydrogen selectivity of at least about 60%.

* * * * *